United States Patent
Kao et al.

(10) Patent No.: US 10,244,113 B2
(45) Date of Patent: Mar. 26, 2019

(54) DETERMINING CUSTOMER SERVICE QUALITY THROUGH DIGITIZED VOICE CHARACTERISTIC MEASUREMENT AND FILTERING

(71) Applicant: FMR LLC, Boston, MA (US)

(72) Inventors: Jason Kao, Cary, NC (US); Xinxin Sheng, Cary, NC (US); Bahram Omidfar, Summit, WI (US); Erkang Zheng, Cary, NC (US)

(73) Assignee: FMR LLC, Boston, MA (US)

( * ) Notice: Subject to any disclaimer, the term of this patent is extended or adjusted under 35 U.S.C. 154(b) by 0 days.

(21) Appl. No.: 15/139,188

(22) Filed: Apr. 26, 2016

(65) Prior Publication Data

US 2017/0310820 A1    Oct. 26, 2017

(51) Int. Cl.
| | |
|---|---|
| *H04M 1/64* | (2006.01) |
| *H04M 3/51* | (2006.01) |
| *G10L 25/63* | (2013.01) |
| *G10L 25/51* | (2013.01) |
| *G10L 25/90* | (2013.01) |
| *G10L 25/87* | (2013.01) |

(52) U.S. Cl.
CPC .......... *H04M 3/5175* (2013.01); *G10L 25/51* (2013.01); *G10L 25/63* (2013.01); *G10L 25/87* (2013.01); *G10L 25/90* (2013.01); *H04M 2201/40* (2013.01); *H04M 2203/2038* (2013.01); *H04M 2203/555* (2013.01); *H04M 2203/556* (2013.01)

(58) Field of Classification Search
CPC .................................................. H04M 3/2236
See application file for complete search history.

(56) References Cited

U.S. PATENT DOCUMENTS

| | | | | |
|---|---|---|---|---|
| 4,959,865 A | * | 9/1990 | Stettiner ................. | G10L 25/78 704/233 |
| 5,987,415 A | * | 11/1999 | Breese .................... | G10L 17/26 704/270 |

(Continued)

FOREIGN PATENT DOCUMENTS

WO    2009153788 A2    12/2009

OTHER PUBLICATIONS

"Call Centers Quality Assurance," available from http://www.nemesysco.com/qa5.html, dated Apr. 15, 2015, 3 pages.

*Primary Examiner* — Joseph T Phan
(74) *Attorney, Agent, or Firm* — Proskauer Rose LLP

(57) ABSTRACT

Methods and apparatuses are described for determining customer service quality through digitized voice characteristic measurement and filtering. A voice analysis module captures a first digitized voice segment corresponding to speech submitted by a user of a remote device. The voice analysis module extracts a first set of voice features from the first voice segment, and determines an emotion level of the user based upon the first set of voice features. The voice analysis module captures a second digitized voice segment corresponding to speech submitted by the user. The voice analysis module extracts a second set of voice features from the second voice segment, and determines a change in the emotion level of the user by comparing the first set of voice features to the second set of voice features. The module normalizes the change in the emotion level of the user using emotion influence factors, and generates a service score.

18 Claims, 3 Drawing Sheets

(56) References Cited

U.S. PATENT DOCUMENTS

| | | | |
|---|---|---|---|
| 6,151,571 A * | 11/2000 | Pertrushin | G10L 17/26 704/207 |
| 6,275,806 B1 * | 8/2001 | Pertrushin | G10L 17/26 704/270 |
| 6,671,668 B2 * | 12/2003 | Harris | G10L 17/26 704/235 |
| 7,283,962 B2 * | 10/2007 | Meyerhoff | G10L 17/26 704/251 |
| 7,788,104 B2 * | 8/2010 | Matsuo | H04M 1/21 379/88.14 |
| 7,983,910 B2 * | 7/2011 | Subramanian | G10L 19/0018 704/250 |
| 8,386,257 B2 | 2/2013 | Irie et al. | |
| 8,654,937 B2 | 2/2014 | Agapi et al. | |
| 8,715,179 B2 | 5/2014 | Price et al. | |
| 8,793,124 B2 * | 7/2014 | Hidaka | G10L 25/00 704/208 |
| 8,863,619 B2 * | 10/2014 | Frank | G06N 99/005 76/12 |
| 8,892,424 B2 * | 11/2014 | Harada | G10L 25/63 704/201 |
| 8,965,770 B2 | 2/2015 | Petrushin | |
| 9,099,088 B2 * | 8/2015 | Washio | G10L 17/26 |
| 2003/0023444 A1 * | 1/2003 | St. John | H04M 3/382 704/270.1 |
| 2003/0055654 A1 * | 3/2003 | Oudeyer | G10L 17/26 704/275 |
| 2003/0182123 A1 * | 9/2003 | Mitsuyoshi | G10L 17/26 704/270 |
| 2004/0249634 A1 * | 12/2004 | Degani | G10L 17/26 704/207 |
| 2007/0192097 A1 * | 8/2007 | Ma | G10L 25/48 704/239 |
| 2011/0178803 A1 | 7/2011 | Petrushin | |
| 2013/0016815 A1 * | 1/2013 | Odinak | H04M 3/5175 379/88.01 |
| 2013/0016823 A1 | 1/2013 | Odinak et al. | |
| 2014/0140496 A1 | 5/2014 | Ripa et al. | |
| 2014/0140497 A1 | 5/2014 | Ripa et al. | |
| 2014/0163960 A1 | 6/2014 | Dimitriadis et al. | |
| 2014/0220526 A1 * | 8/2014 | Sylves | G06Q 30/0201 434/238 |
| 2018/0061415 A1 * | 3/2018 | Penilla | H04L 67/12 |

* cited by examiner

FIG. 1B

Interactive Voice Response (IVR) System 112

Voice Analysis Module 108

Server Computing Device 106

Database 110

Capture Segments

Voice Call

Network 104

Customer Device 102

100

```
┌─────────────────────────────────────────────────────────────┐
│ Capturing a first digitized voice segment corresponding to speech │
│ submitted by a user of a remote device during a voice call 202 │
└─────────────────────────────────────────────────────────────┘
                              │
                              ▼
┌─────────────────────────────────────────────────────────────┐
│ Extracting a first set of voice features of the user from the first │
│              digitized voice segment 204                    │
└─────────────────────────────────────────────────────────────┘
                              │
                              ▼
┌─────────────────────────────────────────────────────────────┐
│ Determining an emotion level of the user based upon the     │
│              first set of voice features 206                │
└─────────────────────────────────────────────────────────────┘
                              │
                              ▼
┌─────────────────────────────────────────────────────────────┐
│ Capturing a second digitized voice segment corresponding to speech │
│     submitted by the user during the voice call 208         │
└─────────────────────────────────────────────────────────────┘
                              │
                              ▼
┌─────────────────────────────────────────────────────────────┐
│ Extracting a second set of voice features of the user from the │
│            second digitized voice segment 210               │
└─────────────────────────────────────────────────────────────┘
                              │
                              ▼
┌─────────────────────────────────────────────────────────────┐
│ Determining a change in the emotion level of the user by comparing │
│ the first set of voice features to the second set of voice features 212 │
└─────────────────────────────────────────────────────────────┘
                              │
                              ▼
┌─────────────────────────────────────────────────────────────┐
│           Normalizing the change in the emotion level of    │
│   the user using one or more emotion influence factors 214  │
└─────────────────────────────────────────────────────────────┘
                              │
                              ▼
┌─────────────────────────────────────────────────────────────┐
│ Generating a customer service score for the voice call based upon the │
│    normalized change in the emotion level of the user 216   │
└─────────────────────────────────────────────────────────────┘
```

FIG. 2

DETERMINING CUSTOMER SERVICE QUALITY THROUGH DIGITIZED VOICE CHARACTERISTIC MEASUREMENT AND FILTERING

TECHNICAL FIELD

This application relates generally to methods and apparatuses, including computer program products, for determining customer service quality through digitized voice characteristic measurement and filtering.

BACKGROUND

An interaction between an employee of a company and an individual who has availed himself or herself of the company's services is typically referred to as a customer service interaction. For example, a customer service interaction can include an account holder calling a financial company to discuss investment options, a patient calling to schedule an appointment with a doctor, and a pension holder calling to retrieve information about his benefits.

Customer service interactions can provide varying degrees of service quality. Some customer service interactions can be of better quality than other customer service interactions. For example, a customer could have a conversation with an experienced customer service representative (CSR) who addresses each of the customer's needs and assists the customer to achieve his desired goals in every respect. As an example, such an interaction may be characterized as having better quality of service compared to a call where the CSR does not adequately answer any of the customer's questions and fails to assist the customer to achieve what the customer wants.

Numerous challenges exist in measuring the quality of customer service interactions due to the wide array of interactions and people involved. For example, different associates may interact with different individual customers, different interactions may have different degrees of difficulty, and different environmental factors may influence customer satisfaction.

One current way to measure a customer's satisfaction with customer service is to ask the customers to manually fill out a survey. Generally, survey response rates are low, with a response rate of 20%-30% considered highly successful, and 10%-15% considered normal. In addition to the low response rate, survey sample size is hard to determine and the margin of error can be difficult to calculate. Slight variations of the target population can result in different survey results as well.

The most challenging customer satisfaction measurement problem is that very satisfied customers and very unhappy customers are typically more vocal than other customers. Such vocal customers are more likely to spend time to fill out surveys. A large percentage of people who consider the service as expected are the silent majority from which it is difficult to obtain meaningful customer service feedback. Thus, the coverage of the survey is not guaranteed. A small proportion of the customers can easily swing the overall satisfaction rating by being more vocal than others. Such survey results are hardly a proportional simulation of the real customer interaction experiences. Customers may also exaggerate their feelings in survey results. It is difficult to objectively measure customer service quality from every customer. There are many issues with the unbiasedness of the current system of measuring customer satisfaction.

SUMMARY

Therefore, methods and systems are needed for automatically determining customer service quality through digitized voice characteristic measurement and filtering. The techniques described herein offer quantitative and objective measurement of customer service quality. The techniques determine a baseline voice profile based upon a digitized voice segment captured from the first few sentences spoken by a customer in a voice call (either to a CSR or to an interactive voice response (IVR) system) and further extract a set of voice features to determine an emotion level of the customer. At a later point in the call, the techniques extract another set of voice features from a second digitized voice segment and determine a change in the emotion level. The techniques then normalize the change in the emotion level to account for certain emotion influence factors, and then generate a customer service score for the CSR on the call.

The techniques provide the advantage of digitally collecting and aggregating voice-based emotion data across a spectrum of callers and calls to assist with the emotion analysis and normalization procedures. As a supplement to live guidance during the call, the techniques can also provide feedback based on historical interactions. The feedback is gathered from certain groupings or categorical distinctions between calls: from the specific associate, the specific customer, specific topic, and generalized information to assist with providing the best possible customer experience by drastically improving customer service quality.

The invention, in one aspect, features a computerized method for determining customer service quality through digitized voice characteristic measurement and filtering. A voice analysis module captures a first digitized voice segment from a remote device, the first digitized voice segment corresponding to speech submitted by a user of the remote device during a voice call. The voice analysis module extracts a first set of voice features of the user from the first digitized voice segment, and determines an emotion level of the user based upon the first set of voice features. The voice analysis module captures a second digitized voice segment from the remote device, the second digitized voice segment corresponding to speech submitted by the user during the voice call. The voice analysis module extracts a second set of voice features of the user from the second digitized voice segment, and determines a change in the emotion level of the user by comparing the first set of voice features to the second set of voice features. The voice analysis module normalizes the change in the emotion level of the user using one or more emotion influence factors, and generates a customer service score for the voice call based upon the normalized change in the emotion level of the user.

The invention, in another aspect, features a system for determining customer service quality through digitized voice characteristic measurement and filtering. The system includes a voice analysis module executing on a processor of a computing device. The voice analysis module is configured to capture a first digitized voice segment from a remote device, the first digitized voice segment corresponding to speech submitted by a user of the remote device during a voice call. The voice analysis module is configured to extract a first set of voice features of the user from the first digitized voice segment, and determine an emotion level of the user based upon the first set of voice features. The voice analysis module is configured to capture a second digitized voice segment from the remote device, the second digitized voice segment corresponding to speech submitted by the user during the voice call. The voice analysis module is configured to extract a second set of voice features of the user from the second digitized voice segment, and determine a change in the emotion level of the user by comparing the first set of voice features to the second set of voice features. The voice analysis module is configured to normalize the change in the emotion level of the user using one or more emotion influence factors, and generate a customer service score for the voice call based upon the normalized change in the emotion level of the user.

The invention, in another aspect, features a computer program product, tangibly embodied in a non-transitory computer readable storage device, for determining customer service quality through digitized voice characteristic measurement and filtering. The computer program product includes instructions operable to cause a voice analysis module executing on a processor of a computing device to capture a first digitized voice segment from a remote device, the first digitized voice segment corresponding to speech submitted by a user of the remote device during a voice call. The computer program product includes instructions operable to cause the voice analysis module to extract a first set of voice features of the user from the first digitized voice segment, and determine an emotion level of the user based upon the first set of voice features. The computer program product includes instructions operable to cause the voice analysis module to capture a second digitized voice segment from the remote device, the second digitized voice segment corresponding to speech submitted by the user during the voice call. The computer program product includes instructions operable to cause the voice analysis module to extract a second set of voice features of the user from the second digitized voice segment, and determine a change in the emotion level of the user by comparing the first set of voice features to the second set of voice features. The computer program product includes instructions operable to cause the voice analysis module to normalize the change in the emotion level of the user using one or more emotion influence factors, and generate a customer service score for the voice call based upon the normalized change in the emotion level of the user.

Any of the above aspects can include one or more of the following features. In some embodiments, the first digitized voice segment is captured from the remote device at a first time during the voice call and the second digitized voice segment is captured from the remote device at a second time during the voice call. In some embodiments, the first time is the beginning of the voice call and the second time is the end of the voice call.

In some embodiments, the voice analysis module captures a plurality of digitized voice segments, including the first digitized voice segment and the second digitized voice segment, continuously during the voice call, analyzes each of the digitized voice segments for voice features of the user, and determines a change in the emotion level of the user by comparing the voice features of the user for each of the digitized voice segments. In some embodiments, the first set of voice features and the second set of voice features include pitch contour, jitter, loudness contour, shimmer contour, utterance duration, audible portions, inaudible portions, and combinations thereof. In some embodiments, emotions represented by the emotion level of the user include anger, sadness, happiness, boredom, and nervousness.

In some embodiments, the voice analysis module calibrates the first digitized voice segment based upon a baseline voice profile for the user. In some embodiments, the baseline voice profile is generated using the first digitized voice segment. In some embodiments, the step of normalizing the change in the emotion level of the user using one or more emotion influence factors comprises determining whether an emotion influence factor applies to the voice call, determining an emotion influence value attributable to the applied emotion influence factor, and adjusting the change in the emotion level of the user based upon the emotion influence value.

In some embodiments, the voice analysis module determines whether an emotion influence factor applies to the voice call based upon one or more of: a date of the voice call, an identity of the user, an identity of a customer service representative participating in the voice call, a topic of the voice call, and an external event to the voice call. In some embodiments, the emotion influence value is determined based upon analyzing a plurality of other voice calls over a predefined time period that share the emotion influence factor. In some embodiments, the remote device is an interactive voice response system.

Other aspects and advantages of the invention will become apparent from the following detailed description, taken in conjunction with the accompanying drawings, illustrating the principles of the invention by way of example only.

BRIEF DESCRIPTION OF THE DRAWINGS

The advantages of the invention described above, together with further advantages, may be better understood by referring to the following description taken in conjunction with the accompanying drawings. The drawings are not necessarily to scale, emphasis instead generally being placed upon illustrating the principles of the invention.

FIG. 1B is a block diagram of a system for determining customer service quality through digitized voice characteristic measurement and filtering using an interactive voice response (IVR) system.

FIG. 2 is a flow diagram of a method for determining customer service quality through digitized voice characteristic measurement and filtering.

DETAILED DESCRIPTION

Figure 1A:
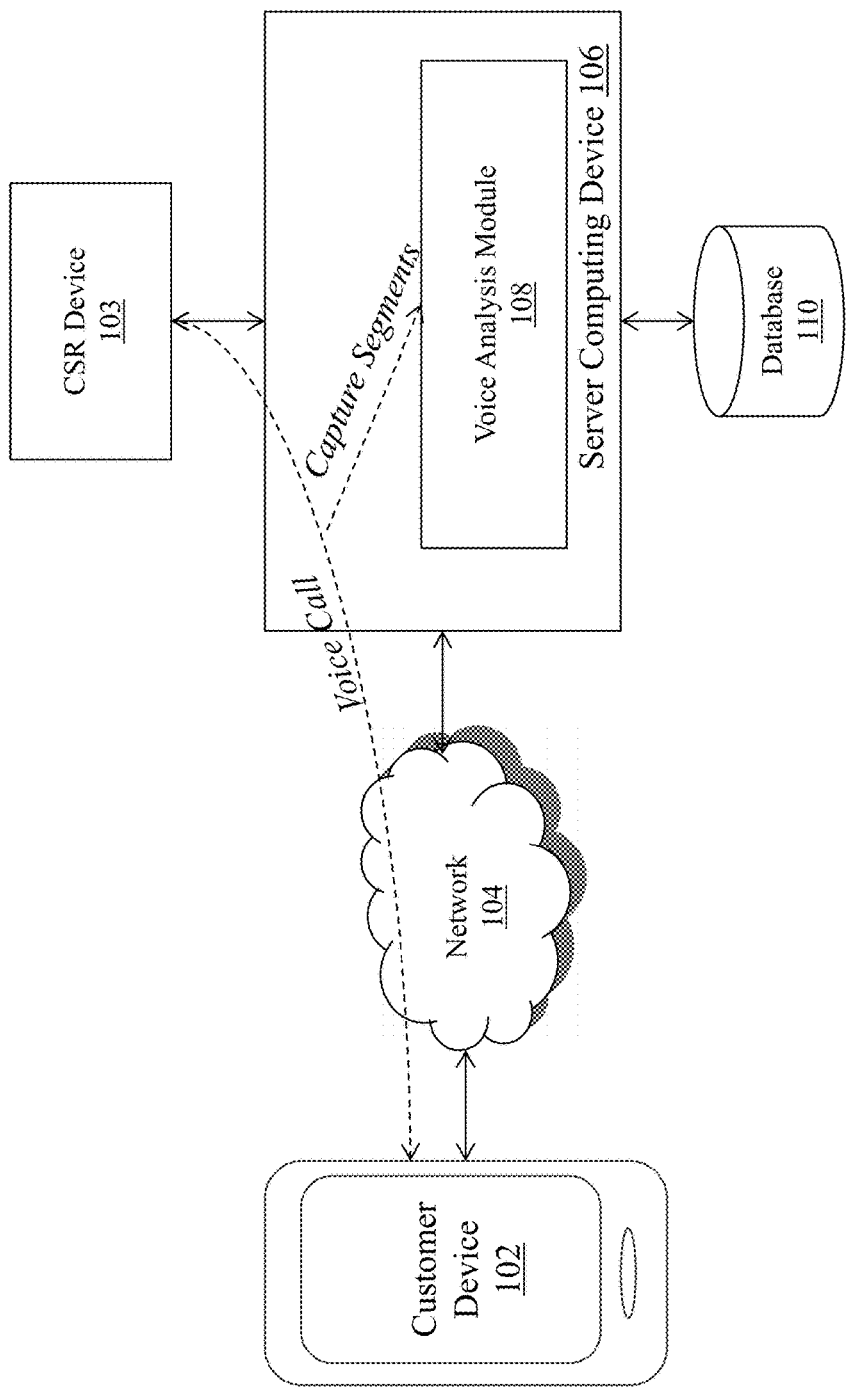
FIG. 1A is a block diagram of a system for determining customer service quality through digitized voice characteristic measurement and filtering.

FIG. 1A is a block diagram of a system 100 for determining customer service quality through digitized voice characteristic measurement and filtering. The system 100 includes a customer device 102 (e.g., a mobile telephone device), a customer service representative (CSR) computing device 103, a communications network 104, a server computing device 106 with a processor that is operable to execute a voice analysis module 108, and a database 110.

The customer device 102 and the CSR device 103 each connect to the communications network 104 in order to communicate with the other components in the system 100 to provide input and receive output relating to the process of determining customer service quality through voice characteristic measurement and filtering as described herein. Generally, the customer device 102 has the capability to establish a voice communication session with the CSR device 103 via the network 104 and the server computing device 106. Example customer devices 102 can include, but are not limited to a smart phone (e.g., Apple iPhone) or other mobile communications device, a personal computer with telephony/voice chat capability, a Voice over IP (VoIP)-enabled device, a telephone or the like. The mobile device 102 includes network-interface components to enable the user to connect to a communications network 104, such as the Internet, wireless network (e.g., GPRS, CDMA, RF), or the like.

The communication network 104 enables the other components of the system 100 to communicate with each other in order to perform the process of determining customer service quality through voice characteristic measurement and filtering as described herein. The network 104 may be a local network, such as a LAN, or a wide area network, such as the Internet and/or a cellular network. In some embodiments, the network 104 is comprised of several discrete networks and/or sub-networks (e.g., cellular to Internet) that enable the components of the system 100 to communicate with each other.

The server computing device 106 is a computing device having a processor and comprising a combination of hardware and software modules for coordinating the voice communication between the devices 102, 103 and determining customer service quality through voice characteristic measurement and filtering. The server computing device 106 includes a voice analysis module 108. The module 108 is a hardware and/or software module that resides on the server computing device 106 to perform functions associated with determining customer service quality through voice characteristic measurement and filtering.

The system 100 also includes a database 110. The database 110 is coupled to the server computing device 106 of the system 100 and stores data used by the server computing device 106 to perform the process of determining customer service quality through voice characteristic measurement and filtering as described herein. The database 110 can be integrated with the server computing device 106, or be located on a separate computing device. An example database that can be used with the system 100 is MySQL™ available from Oracle Corp. of Redwood City, Calif.

FIG. 1B is a block diagram of a system 100 for determining customer service quality through digitized voice characteristic measurement and filtering using an interactive voice response (IVR) system 112. The system depicted in FIG. 1B has many of the same elements as in FIG. 1A, except that the customer device 102 conducts a voice call with an IVR system 112 instead of (or in some embodiments, in addition to) the CSR device 103 from FIG. 1A. The voice analysis module 108 captures digitized voice segments from the voice call between the customer device 102 and the IVR system 112.

FIG. 2 is a flow diagram of a method 200 for determining customer service quality through digitized voice characteristic measurement and filtering, using the system 100 of FIG. 1A or FIG. 1B. The voice analysis module 108 captures (202) a first digitized voice segment corresponding to speech submitted by a user of a remote device (e.g., customer device 102) during a voice call. In the context of a customer service interaction, a user/customer may utilize his or her mobile phone to dial a company's call center in order to speak to a representative regarding a question or problem with service the customer has received from the company. For example, a customer may call a financial services company with which the customer holds a brokerage account to discuss investment options, schedule a meeting with a financial advisor, or inquire about his account history.

During the call, the customer speaks with the CSR (and/or an IVR system) and the voice analysis module 108 captures digitized voice segments that are generated from the customer's speech. In some embodiments, the voice analysis module 108 captures, e.g., a digital bitstream of the voice call and parses the bitstream to locate the speech segments associated with the customer. It should be appreciated that the voice analysis module 108 is capable of digitizing the voice segments, in the case that the segments are captured or otherwise received in non-digital form. The voice analysis module 108 can also perform functions to improve the audio quality of the digitized voice segments, such as adjusting compression, converting the segments to another format, reducing or eliminating background noise, and so forth.

In some embodiments, the voice analysis module 108 captures a digitized voice segment at the beginning of the voice call. For example, the CSR may ask the customer an initial question or series of questions to help understand who the customer is/authenticate the customer, and to understand why they are calling (e.g., what is the customer's name, reason for the call, etc.) The voice analysis module 108 uses the customer's response to an initial question as the first digitized voice segment.

It should be appreciated that, in some embodiments, the voice analysis module 108 continuously captures digitized voice segments from the customer throughout the call and uses the voice segments in the manner described herein. For example, the voice analysis module 108 can be configured to continuously capture and measure digitized voice segments according to user-defined settings (e.g., 10-second segments, 20-second segments, 60-second segments).

The voice analysis module 108 extracts (204) a first set of voice features of the user from the first digitized voice segment. The module 108 computationally analyzes the spectrogram and/or the waveform of the digitized voice segment to determine certain characteristics of the user's speech which are referred to as voice features. Exemplary voice features include but are not limited to pitch contour, jitter, loudness contour, shimmer contour, utterance duration, audible portions, inaudible portions, and also including combinations thereof. The module 108 can store the first set of voice features of the user in the database 110 and/or in another memory that is coupled to the module 108. As can be appreciated, the voice features discussed above can be computationally quantified and measured using any number of statistical analyses, such as minimum, maximum, mean, and standard deviation.

In some embodiments, the first set of voice features that are extracted from the first digitized voice segment are used by the voice analysis module 108 to generate a baseline voice profile for the user. The voice analysis module 108 can use the baseline voice profile to assist in determining and measuring an emotion level of the user, as will be explained in greater detail below. The voice analysis module 108 uses the baseline voice profile to determine which voice features and/or characteristics of the voice features may be attributable to the customer's emotion level and which voice features/characteristics may be attributable more generally to the customer's physiological voice profile (and are independent of any emotion being experienced by the customer). For example, if the customer's loudness contour is consistently below a certain threshold, regardless of the purpose of the call or other potentially emotion-based elements, the voice analysis module 108 can incorporate the customer's loudness contour into the baseline voice profile and account for the specific loudness contour when determining an emotion level of the user.

Generation of the baseline voice profile is particularly useful if the user has not previously called in to the company's service center, as the voice analysis module 108 would not have voice profile information to use in the emotion analysis described below. Similarly, for a customer that has a baseline voice profile already available, the voice analysis module 108 can compare the stored baseline voice profile to the voice profile generated during the present call to detect any patterns and/or differences in the two profiles—which can further enhance the robustness and accuracy of the emotion analysis. For example, if a customer's baseline voice profile indicates a certain average utterance duration, but during the present call the customer's average utterance duration is markedly shorter, the voice analysis module 108 can detect the difference between the two average durations—which could suggest that the user is speaking in a more terse or clipped fashion during the present call, and may be angry or agitated. It should be appreciated that the module 108 can iteratively update and calibrate the customer's baseline voice profile over time as the customer initiates numerous calls with the customer service center.

Next, the voice analysis module 108 determines (206) an emotion level of the user based upon the set of voice features extracted from the first digitized voice segment. Again, as mentioned above, voice features having certain values or levels are indicative of certain emotions being experienced by the customer during a call. The concept is that the affective state of a person in a social interaction can be measured by a set of objective voice features. The affective states involve physiological reactions: for example, changes in autonomic nervous system and somatic nervous systems. As a result, affective state changes involuntarily involve modification of different aspects of the voice production process. For example, an anger state is related to changes in respiration and increase in muscle tension, which influence the vibration of the vocal folds and the vocal tract shape—therefore affecting the acoustic characteristics of the customer's speech.

Generally, emotions expressed in the voice can be analyzed at three different levels, the physiological level, the phonatory-articulatory level, and the acoustic level. Voice cues are commonly divided into those related to:
  fundamental frequency: a correlate of the perceived pitch;
  vocal perturbation: short-term variability in sound production;
  voice quality: a correlate of the perceived 'timbre';
  intensity: a correlate of the perceived loudness;
  temporal aspects of speech: speech rate; and
  various combinations of these aspects, for example, prosodic features.

Anger is one of the most noticeable emotions and it is also critical for customer service performance and feedback. Other types of emotions that can be detected include sadness, boredom, and happiness. The module 108 can analyze the following voice features, among others, to determine a customer's emotion level that is representative of particular emotion(s):
  Frequency: pitch contour, jitter;
  Energy: loudness contour, shimmer contour (like jitter but based on energy changes); and
  Audible Duration: audible segments, inaudible segments, utterance duration.

The voice analysis module 108 analyzes these types of voice features, using the methodology described above, to determine emotion(s) of the customer—including the attribution of a value or magnitude to each voice feature. For example, the module 108 can analyze the first digitized voice segment and determine that the utterance duration is short (e.g., averaging less than four seconds per utterance), the speech rate is high (e.g., the user speaks several words in a short period), and the loudness contour and the pitch contour are generally even with each exhibiting occasional sharp increases. Based upon these values, the module 108 determines that the customer is angry. The voice analysis module 108 can also weight each of the voice features to emphasize the importance of certain voice features in the overall emotion analysis.

It should be appreciated that voice features and environmental factors are generally interrelated and not completely independent of each other. In one example, a person tends to be louder when the stock market generates bad news (e.g., the stock market index dropped by 3%). Therefore, if the environmental factor of bad stock market news is eliminated without considering how that factor affects the voice feature of loudness, the module 108 cannot generate an accurate classification. To treat these characteristics in the context of each other, the module 108 employs a data structure—namely, a vector—that contains all voice features and environmental factors as a bundle.

Let vector $\vec{v}$ describe a segment of customer conversation that the module 108 analyzes for acoustic emotion prediction in a certain environment. The voice itself contains a set of features including intensity, voice quality, frequency, pitch, loudness, and so forth, as described above. The vector $\vec{v}$ also includes other environmental factors that affect customer service satisfaction.

The module 108 determines if the vector $\vec{v}$ for analysis can be classified in one the following groups: {Positive, Negative, Neutral}, which models the problem that where given a vector $\vec{v}$ with many dimensions, how does the module 108 classify the vector $\vec{v}$ into one of the predefined groups. It should be understood that other classification mechanisms and techniques may exist, and the mechanism described herein is one example.

Fractional Factoral Design

Fractional factorial designs are experimental designs consisting of a carefully chosen subset (fraction) of the experimental runs of a full factorial design. The purpose of fractional factorial design is to separate main effects and low-order interactions from one another. When there are many factors in the domain space and factors are interrelated, the module 108 can use a principal components analysis (PCA) technique for the initial data grooming to pick up what characteristics make difference for dimensionality reduction.

For example, for a vector $\vec{v}_i$ in group X, $$\vec{v}_i = (d_1, d_2, d_3, \ldots, d_t)_{(i)}$$

where dimension d are the factors that contribute to $\vec{v}_i$; $\vec{v}_i$ is the i-th element in the group X.

Suppose there are t dimensions, then theoretically the PCA technique can generate up to t number of principal components. Yet in practice, most of the time the top two or three principal components contain 90% of the information or more. Therefore, the PCA technique can significantly reduce the calculation complexity.

One example of a PCA technique performed by the module 108 is as follows:

1) Organize the data set. Suppose the number of vectors in group X is m, the vectors are of dimension n, then the matrix X is (m*n).

2) Calculate the empirical mean for a vector $v_i$, for the jth dimension of v:

$$v_i[j] = \frac{1}{n}\sum_{i=n}^{n} X[i, j]$$

3) Calculate the deviations B from the mean:

$$B = X - h_i v_i^T$$

Where h is an n×1 column vector of all 1s.

4) Create covariance matrix C:

$$C = \frac{1}{n-1} B^T B$$

5) Compute the matrix V of eigenvectors which diagonalizes the covariance matrix C. The eigenvalues and eigenvectors are ordered and paired. The jth eigenvalue corresponds to the jth eigenvector.

$$V^{-1}CV = D$$

6) Rearrange eigenvalues from the largest to the smallest, and select the largest k numbers.

7) Create the matrix V consisting of the set of selected eigenvectors of C, one eigenvector per column. Matrix V is p*p.

8) Convert the source data to z-score. Z-score (also called standard score) is the signed number of standard deviations that the source data is above the mean; a positive z-score indicates data above the mean while a negative z-score indicates data below the mean. Create a p×1 empirical standard deviation vector s from the square root of each element along the main diagonal of the diagonalized covariance matrix C:

$$s = \{s[i]\} = \{\sqrt{C[i, i]}\}, \text{ for } i = 1, \ldots, p$$

9) Calculate the n×p z-score matrix:

$$Z = \frac{B}{h * S^T}, \text{ divide element by element}$$

10) Project the z-scores of data onto the new basis.

Suppose the number of vectors in group X is m, the vectors are of dimension n, then the matrix with data adjusted according to the empirical mean is (m*n), the covariance matrix is (n*n), and the eigenvectors after selecting p dimensions is (n*p), and the projected final data is (m*p). So given the calculation, the number of dimensions is successfully reduced from m to p, where (p<<m).

The voice analysis module 108 captures (208) a second digitized voice segment corresponding to speech submitted by the user during the voice call. For example, at the conclusion of the call, the voice analysis module 108 captures a digitized voice segment of the customer as the customer responds to certain inquiries from the CSR (e.g., "is there anything else I can help you with today?"). The voice analysis module 108 extracts (210) a second set of voice features of the user from the second digitized voice segment. As mentioned above with respect to the first digitized voice segment, the voice analysis module 108 computationally analyzes the spectrogram and/or the waveform of the second digitized voice segment to determine certain characteristics of the user's speech which are referred to as voice features. The module 108 can store the second set of voice features of the user in the database 110 and/or in another memory that is coupled to the module 108.

The voice analysis module 108 determines (212) a change in the emotion level of the user by comparing the first set of voice features to the second set of voice features. As described above, the voice analysis module determines an emotion level of the user at the beginning of the voice call. Similarly, the voice analysis module 108 determines an emotion level of the user at the conclusion of the call by analyzing the same voice features. For example, the voice analysis module 108 can determine that the emotion level at the end of the call is lower than the emotion level at the beginning of the call, indicating that the customer's anger which was expressed at the beginning of the call has gone down, or perhaps the anger is now replaced with happiness and/or satisfaction.

In some cases, the change in the customer's emotion level over the duration of the call may be attributable to the performance of the CSR—for example, the rep may have been able to answer the customer's questions quickly and accurately, and address the customer's concerns with solutions that the customer appreciated. The voice analysis module 108 can generate a customer service score for the voice call based upon the change in the customer's emotion level.

However, as mentioned above, the customer's emotion level is not simply based upon factors only associated with the call (e.g., conversation with the CSR or an interactive voice system, problem with the customer service being provided). Often, there are other factors at play which affect or influence the customer's emotion level and at the same time are external to, or independent of, the service being provided by the CSR. In order to accurately gauge the performance of the CSR, it is important to understand the effect that such external or independent emotion influence factors (also called noise) have on the emotion level of the user so that the voice analysis module 108 can normalize (214) the emotion level in light of these factors.

As set forth earlier, one of these emotion influence factors can simply be characteristics associated with the user's voice (as represented in the baseline voice profile) that may erroneously indicate a certain emotion level. For example, a user's voice may exhibit certain acoustic features such as a loud or uneven pitch that typically indicate anger, but are in fact just contained within the user's normal speaking voice and are independent of emotion for this particular user. Using the baseline voice profile, the voice analysis module 108 can normalize the change in the user's emotion level (e.g., adjust the emotion level for each of the digitized voice segments captured during the call) to filter out any characteristics of the user's baseline voice profile that may influence the emotion level(s) and to more accurately reflect the change in customer emotion level that is attributable to the CSR.

Another emotion influence factor is the topics discussed on the call or reason for the customer to call the CSR. As can be appreciated, customer service interactions do not always involve pleasant conversations. For example, when a customer's requests cannot be satisfied because of service availability, company policy, or other reasons, the customer's dissatisfaction is not caused by the CSR. The customer's emotion level and/or change in emotion level during a call may be skewed by such noise, and therefore it needs to be eliminated from the determined emotion level(s) to ensure the work quality of the CSR is properly determined.

The voice analysis module 108 can categorize topics based upon, e.g., the division to which the user is calling, the nature of the business, and so forth, and rate the topics involved in the call as:

Positive;
Negative;
Emotional Neutral or Informational.

In one example, K-means clustering is used to classify service call effectiveness. Simplifying the data with a PCA technique, such as the one shown above, can significantly reduce the calculation difficulty. The next step for the module 108 is to use k-means clustering to classify the data into groups. Clustering is the task of grouping a set of objects in such a way that objects in the same group (called a cluster) are more similar (in some sense or another) to each other than to those in other groups (clusters). It should be understood that k-means clustering is used herein as an example, and other clustering algorithms are available.

In general, finding the optimal solution to k-means clustering can be an NP-hard problem. For example, if group number k and d (the dimension) are fixed, the problem can be exactly solved in time $$O(n^{dk+1} \log n)$$

where n is the number of entities to be clustered. As used above, the Big O notation is a mathematical notation that describes the limiting behavior of a function when the argument tends toward a particular value or infinity. It characterizes functions according to their growth rates; different functions with the same growth rate may be represented using the same O notation.

One example of a k-means clustering technique performed by the module 108 is as follows:

1) Calculate the Euclidian distance between two vectors X and Y with d dimensions $$\|\vec{x} - \vec{y}\| =$$
$$d(\vec{x} - \vec{y}) = \sqrt{(x_1 - y_1)^2 + (x_2 - y_2)^2 + \ldots + (x_i + y_i)^2 + \ldots + (x_d - y_d)^2}$$

2) Assign each data record to a group.
3) Calculate the centroid of the group X that consists of vector v:

$$\overline{v_x} = \frac{1}{\|X\|} \sum_{i \in X} v_i$$

where $\|X\|$ is the set size (the number of elements in the group).

4) Calculate the sum of distance functions of each point in the cluster to the center of each group k, called within-cluster sum of squares (WCSS):

$$\sum_{i=1}^{k} \sum_{v \in X} \|v - \overline{v_x}\|^2$$

5) Update the data assignment so that WCCS is smaller.
6) Calculate the new means to be the centroids of the observations in the new clusters.
7) Repeat until the n observations are partitioned into k(≤n) sets so as to minimize the WCSS.

For example, if a customer is offered a promotional discount during the voice call with the CSR, the customer could be 20% more joyful than his emotion level when he started the conversation. However, whether the CSR has actually performed well is unknown until the voice analysis module 108 integrates this data with data for calls from other callers to the service center that also received a discount in order to show the topic's aggregate impact on emotions. Continuing with the example, if customers are generally 20% more joyful after offered such promotions, then this CSR has done a fair job (i.e., the current customer is just as joyful as all the other customers that received the discount— so the CSR's performance did not impact the emotion level). However, if customers are generally 10% more joyful after offered such promotions, then this CSR has done an excellent job because the customer's emotion level exceeds the general (or expected) emotion level, based upon the emotion levels of other callers, by 10%.

It is useful to categorize call types based upon resources utilized and energy involved. For example, if a customer is simply calling to get their account number or similar routine, informational requests, the level of service required from the CSR is quite different than a customer calling to migrate accounts, having a problem with a bill, or another more complex request. Customer service representatives should be evaluated based upon the difficulty level of the service required.

In addition to the influence from the topics, external environment factors not associated with the customer service itself can have an impact on customer satisfaction. There are elements that affect customer satisfaction but are not directly caused by the service itself.

For example, in November and December, sales typically soar in retail industries. But, one cannot assume that because customers are buying more at that time of year, customers are more satisfied with a store's customer service. Instead, the increase in sales are likely attributable to an external environment factor, namely the holiday season. It may be that customers are generally more joyful in all conversations because they are looking forward to the holiday season. So a customer that calls into a customer service center during that time may exhibit an emotion level that is skewed because of this external emotional influence factor, and is not based upon the service being provided by the CSR.

Another example is that during a financial bull market, people tend to buy more and invest more. It does not necessarily mean that the customer service provided by financial institutions is better during this time. It may be that customers speak faster on the phone because of the excitement of making money. A related example is that customers invested in a specific stock which plummets, or the company goes bankrupt, may become angrier or more upset due to the performance of their portfolios—and not necessarily due to the performance of the CSR.

The voice analysis module 108 can eliminate or normalize such external environment influence factors by aggregating calls into groups and evaluating the groups. When the acoustic feedback measurement shows a trend for a specific group (e.g., a customer service group), the trend, which may raise or lower the bar for the entire group, can be considered as caused by an external environment factor. Individual customer representative's work performance is calculated from a difference with the "group factors."

The net positive or negative change in emotion level can be used as guide to provide feedback to enhance the customer service experience. For example, the voice analysis module 108 can display the change in emotion level graphically to the CSR via a screen on the CSR device 103, periodically through the call and be able to assess how the customer's emotion level is changing throughout the call. The voice analysis module 108 can generate other types of graphical representations such as charts, graphs, alerts, and so forth.

In addition, the change in emotion level can be categorized and aggregated using a grouping technique for noise elimination. The change in emotion level can be normalized based on the following categorical distinctions: the specific customer, the specific topic, characteristics that are shared across customers and/or that are important to the business, and/or a global factor (e.g., an emotion influence factor that affects a large majority of callers or everyone). After noise elimination, the normalized change in the emotion level is used to generate (216) a customer service score for the voice call.

Grouping can be performed based upon any number of characteristics or categorizations. For example, a customer service center for a financial services company may categorize callers by asset amount. An auto insurance company may categorize customers by the car model they drive. A video gaming company may categorize people by the avatar they select. In other examples, the customer service center may aggregate callers according to a preferred timeline (e.g. the last five weeks of the year in retail industry), or according to events that have impacted the area (e.g. scandals impacts on public election).

Therefore, using the above techniques and algorithms, the system can generate a score that accounts for the context of an external environment factor in relation to a caller's voice characteristics. As a result, the systems and methods described herein provides a more accurate and nuanced determination of a customer's emotional factors as presented in digitized voice segments captured by the system.

The above-described techniques can be implemented in digital and/or analog electronic circuitry, or in computer hardware, firmware, software, or in combinations of them. The implementation can be as a computer program product, i.e., a computer program tangibly embodied in a machine-readable storage device, for execution by, or to control the operation of, a data processing apparatus, e.g., a programmable processor, a computer, and/or multiple computers. A computer program can be written in any form of computer or programming language, including source code, compiled code, interpreted code and/or machine code, and the computer program can be deployed in any form, including as a stand-alone program or as a subroutine, element, or other unit suitable for use in a computing environment. A computer program can be deployed to be executed on one computer or on multiple computers at one or more sites. The computer program can be deployed in a cloud computing environment (e.g., Amazon® AWS, Microsoft® Azure, IBM®).

Method steps can be performed by one or more processors executing a computer program to perform functions of the invention by operating on input data and/or generating output data. Method steps can also be performed by, and an apparatus can be implemented as, special purpose logic circuitry, e.g., a FPGA (field programmable gate array), a FPAA (field-programmable analog array), a CPLD (complex programmable logic device), a PSoC (Programmable System-on-Chip), ASIP (application-specific instruction-set processor), or an ASIC (application-specific integrated circuit), or the like. Subroutines can refer to portions of the stored computer program and/or the processor, and/or the special circuitry that implement one or more functions.

Processors suitable for the execution of a computer program include, by way of example, special purpose microprocessors specifically programmed with instructions executable to perform the methods described herein, and any one or more processors of any kind of digital or analog computer. Generally, a processor receives instructions and data from a read-only memory or a random access memory or both. The essential elements of a computer are a processor for executing instructions and one or more memory devices for storing instructions and/or data. Memory devices, such as a cache, can be used to temporarily store data. Memory devices can also be used for long-term data storage. Generally, a computer also includes, or is operatively coupled to receive data from or transfer data to, or both, one or more mass storage devices for storing data, e.g., magnetic, magneto-optical disks, or optical disks. A computer can also be operatively coupled to a communications network in order to receive instructions and/or data from the network and/or to transfer instructions and/or data to the network. Computer-readable storage mediums suitable for embodying computer program instructions and data include all forms of volatile and non-volatile memory, including by way of example semiconductor memory devices, e.g., DRAM, SRAM, EPROM, EEPROM, and flash memory devices; magnetic disks, e.g., internal hard disks or removable disks; magneto-optical disks; and optical disks, e.g., CD, DVD, HD-DVD, and Blu-ray disks. The processor and the memory can be supplemented by and/or incorporated in special purpose logic circuitry.

To provide for interaction with a user, the above described techniques can be implemented on a computing device in communication with a display device, e.g., a CRT (cathode ray tube), plasma, or LCD (liquid crystal display) monitor, a mobile device display or screen, a holographic device and/or projector, for displaying information to the user and a keyboard and a pointing device, e.g., a mouse, a trackball, a touchpad, or a motion sensor, by which the user can provide input to the computer (e.g., interact with a user interface element). Other kinds of devices can be used to provide for interaction with a user as well; for example, feedback provided to the user can be any form of sensory feedback, e.g., visual feedback, auditory feedback, or tactile feedback; and input from the user can be received in any form, including acoustic, speech, and/or tactile input.

The above-described techniques can be implemented in a distributed computing system that includes a back-end component. The back-end component can, for example, be a data server, a middleware component, and/or an application server. The above described techniques can be implemented in a distributed computing system that includes a front-end component. The front-end component can, for example, be a client computer having a graphical user interface, a Web browser through which a user can interact with an example implementation, and/or other graphical user interfaces for a transmitting device. The above described techniques can be implemented in a distributed computing system that includes any combination of such back-end, middleware, or front-end components.

The components of the computing system can be interconnected by transmission medium, which can include any form or medium of digital or analog data communication (e.g., a communication network). Transmission medium can include one or more packet-based networks and/or one or more circuit-based networks in any configuration. Packet-based networks can include, for example, the Internet, a carrier internet protocol (IP) network (e.g., local area network (LAN), wide area network (WAN), campus area network (CAN), metropolitan area network (MAN), home area network (HAN)), a private IP network, an IP private branch exchange (IPBX), a wireless network (e.g., radio access network (RAN), Bluetooth, near field communications (NFC) network, Wi-Fi, WiMAX, general packet radio service (GPRS) network, HiperLAN), and/or other packet-based networks. Circuit-based networks can include, for example, the public switched telephone network (PSTN), a legacy private branch exchange (PBX), a wireless network (e.g., RAN, code-division multiple access (CDMA) network, time division multiple access (TDMA) network, global system for mobile communications (GSM) network), and/or other circuit-based networks.

Information transfer over transmission medium can be based on one or more communication protocols. Communication protocols can include, for example, Ethernet protocol, Internet Protocol (IP), Voice over IP (VOIP), a Peer-to-Peer (P2P) protocol, Hypertext Transfer Protocol (HTTP), Session Initiation Protocol (SIP), H.323, Media Gateway Control Protocol (MGCP), Signaling System #7 (SS7), a Global System for Mobile Communications (GSM) protocol, a Push-to-Talk (PTT) protocol, a PTT over Cellular (POC) protocol, Universal Mobile Telecommunications System (UMTS), 3GPP Long Term Evolution (LTE) and/or other communication protocols.

Devices of the computing system can include, for example, a computer, a computer with a browser device, a telephone, an IP phone, a mobile device (e.g., cellular phone, personal digital assistant (PDA) device, smart phone, tablet, laptop computer, electronic mail device), and/or other communication devices. The browser device includes, for example, a computer (e.g., desktop computer and/or laptop computer) with a World Wide Web browser (e.g., Chrome™ from Google, Inc., Microsoft® Internet Explorer® available from Microsoft Corporation, and/or Mozilla® Firefox available from Mozilla Corporation). Mobile computing device include, for example, a Blackberry® from Research in Motion, an iPhone® from Apple Corporation, and/or an Android™-based device. IP phones include, for example, a Cisco® Unified IP Phone 7985G and/or a Cisco® Unified Wireless Phone 7920 available from Cisco Systems, Inc.

Comprise, include, and/or plural forms of each are open ended and include the listed parts and can include additional parts that are not listed. And/or is open ended and includes one or more of the listed parts and combinations of the listed parts.

One skilled in the art will realize the subject matter may be embodied in other specific forms without departing from the spirit or essential characteristics thereof. The foregoing embodiments are therefore to be considered in all respects illustrative rather than limiting of the subject matter described herein.

What is claimed is:

1. A computerized method for determining customer service quality through digitized voice characteristic measurement and filtering, the method comprising:

capturing, by a voice analysis module of a computing device, a first bitstream containing a first digitized voice segment from a remote device, the first digitized voice segment corresponding to speech submitted by a user of the remote device during a voice call;

adjusting, by the voice analysis module, compression of the first bitstream containing the first digitized voice segment to enhance audio quality of the first bitstream;

extracting, by the voice analysis module, a first set of voice features of the user from the first digitized voice segment by analyzing one or more of a spectrogram or a waveform of the first digitized voice segment to determine quantifiable characteristics associated with the user's voice and assigning the determined quantifiable characteristics as the first set of voice features;

determining, by the voice analysis module, an emotion level of the user by comparing the first set of voice features to one or more voice features associated with a baseline voice profile previously generated for the user;

capturing, by the voice analysis module, a second bitstream containing a second digitized voice segment from the remote device, the second digitized voice segment corresponding to speech submitted by the user during the voice call;

adjusting, by the voice analysis module, compression of the second bitstream containing the second digitized voice segment to enhance audio quality of the second bitstream;

extracting, by the voice analysis module, a second set of voice features of the user from the second digitized voice segment by analyzing one or more of a spectrogram or a waveform of the second digitized voice segment to determine quantifiable characteristics associated with the user's voice and assigning the determined quantifiable characteristics as the second set of voice features;

determining, by the voice analysis module, a change in the emotion level of the user by comparing the first set of voice features to the second set of voice features;

normalizing, by the voice analysis module, the change in the emotion level of the user using one or more environmental emotion influence factors by:

determining, by the voice analysis module, whether one or more of the environmental emotion influence factors applies to the voice call;

determining, by the voice analysis module, an emotion influence value attributable to the applied environmental emotion influence factors; and adjusting, by the voice analysis module, the change in the emotion level of the user based upon the emotion influence value;

generating, by the voice analysis module, a customer service score for the voice call based upon the normalized change in the emotion level of the user; and displaying, by the voice analysis module on a display device coupled to the computing device periodically during the voice call, a current emotion level of the user based upon the determined change in the emotion level.

2. The method of claim 1, wherein the first bitstream is captured from the remote device at a first time during the voice call and the second bitstream is captured from the remote device at a second time during the voice call.

3. The method of claim 2, wherein the first time is the beginning of the voice call and the second time is the end of the voice call.

4. The method of claim 1, further comprising:

capturing, by the voice analysis module, a plurality of other bitstreams containing other digitized voice segments from the remote device the plurality of voice segments each corresponding to speech submitted by a user of the remote device during a prior voice call;

adjusting, by the voice analysis module, compression of the plurality of bitstreams containing the digitized voice segments to enhance audio quality of the plurality of bitstreams;

extracting, by the voice analysis module, voice features of the user from each of the digitized voice segments by analyzing one or more of a spectrogram or a waveform of each of the digitized voice segments to determine quantifiable characteristics associated with the user's voice and assigning the determined quantifiable characteristics as the second set of voice features; and generating, by the voice analysis module, the baseline voice profile for the user based upon the extracted voice features.

5. The method of claim 1, wherein the first set of voice features and the second set of voice features include pitch contour, jitter, loudness contour, shimmer contour, utterance duration, audible portions, inaudible portions, and combinations thereof.

6. The method of claim 5, wherein the emotions represented by the emotion level of the user include anger, sadness, happiness, boredom, and nervousness.

7. The method of claim 1, wherein the voice analysis module determines whether one or more of the environmental emotion influence factor applies to the voice call based upon one or more of: a date of the voice call, an identity of a customer service representative participating in the voice call, a topic of the voice call, or an external event to the voice call.

8. The method of claim 1, wherein the emotion influence value is determined based upon analyzing a plurality of other voice calls over a predefined time period that share one or more of the environmental emotion influence factors applied to the voice call.

9. The method of claim 1, wherein the remote device is an interactive voice response system.

10. A system for determining customer service quality through digitized voice characteristic measurement and filtering, the system comprising a computing device having a memory for storing a voice analysis module and a processor that executes the voice analysis module to:

capture a first bitstream containing a first digitized voice segment from a remote device, the first digitized voice segment corresponding to speech submitted by a user of the remote device during a voice call;

adjust compression of the first bitstream containing the first digitized voice segment to enhance audio quality of the first bitstream;

extract a first set of voice features of the user from the first digitized voice segment by analyzing one or more of a spectrogram or a waveform of the first digitized voice segment to determine quantifiable characteristics associated with the user's voice and assigning the determined quantifiable characteristics as the first set of voice features;

determine an emotion level of the user by comparing the first set of voice features to one or more voice features associated with a baseline voice profile previously generated for the user;

capture a second bitstream containing a second digitized voice segment from the remote device, the second digitized voice segment corresponding to speech submitted by the user during the voice call;

adjust compression of the second bitstream containing the first digitized voice segment to enhance audio quality of the second bitstream;

extract a second set of voice features of the user from the second digitized voice segment by analyzing one or more of a spectrogram or a waveform of the second digitized voice segment to determine quantifiable characteristics associated with the user's voice and assigning the determined quantifiable characteristics as the second set of voice features;

determine a change in the emotion level of the user by comparing the first set of voice features to the second set of voice features;

normalize the change in the emotion level of the user using one or more environmental emotion influence factors by:
  determining whether one or more of the environmental emotion influence factors applies to the voice call;
  determining an emotion influence value attributable to the applied environmental emotion influence factors; and
  adjusting the change in the emotion level of the user based upon the emotion influence value;

generate a customer service score for the voice call based upon the normalized change in the emotion level of the user; and display, on a display device coupled to the computing device periodically during the voice call, a current emotion level of the user based upon the determined change in the emotion level.

11. The system of claim 10, wherein the first bitstream is captured from the remote device at a first time during the voice call and the second bitstream is captured from the remote device at a second time during the voice call.

12. The system of claim 11, wherein the first time is the beginning of the voice call and the second time is the end of the voice call.

13. The system of claim 10, wherein the processor further executes the voice analysis module to:

capture a plurality of other bitstreams containing other digitized voice segments from the remote device the plurality of voice segments each corresponding to speech submitted by a user of the remote device during a prior voice call;

adjust compression of the plurality of bitstreams containing the digitized voice segments to enhance audio quality of the plurality of bitstreams;

extract voice features of the user from each of digitized voice segments by analyzing one or more of a spectrogram or a waveform of each of the digitized voice segments to determine quantifiable characteristics associated with the user's voice and assigning the determined quantifiable characteristics as the second set of voice features; and generating, by the voice analysis module, the baseline voice profile for the user based upon the extracted voice features;

analyze each of the digitized voice segments for voice features of the user; and determine a change in the emotion level of the user by comparing the voice features of the user for each of the digitized voice segments.

14. The system of claim 10, wherein the first set of voice features and the second set of voice features include pitch contour, jitter, loudness contour, shimmer contour, utterance duration, audible portions, inaudible portions, and combinations thereof.

15. The system of claim 14, wherein emotions represented by the emotion level of the user include anger, sadness, happiness, boredom, and nervousness.

16. The system of claim 10, wherein the voice analysis module determines whether one or more of the environmental emotion influence factors applies to the voice call based upon one or more of: a date of the voice call, an identity of a customer service representative participating in the voice call, a topic of the voice call, or an external event to the voice call.

17. The system of claim 10, wherein the voice analysis module determines the emotion influence value based upon analyzing a plurality of other voice calls over a predefined time period that share one or more of the environmental emotion influence factors applied to the voice call.

18. The system of claim 10, wherein the remote device is an interactive voice response system.

* * * * *

UNITED STATES PATENT AND TRADEMARK OFFICE
CERTIFICATE OF CORRECTION

PATENT NO. : 10,244,113 B2
APPLICATION NO. : 15/139188
DATED : March 26, 2019
INVENTOR(S) : Kao et al.

Page 1 of 1

It is certified that error appears in the above-identified patent and that said Letters Patent is hereby corrected as shown below:

In the Claims

At Line 3 of Claim 7 (Column 17, Line 26), replace "factor" with "factors"

Signed and Sealed this
Sixteenth Day of July, 2019

Andrei Iancu
*Director of the United States Patent and Trademark Office*